United States Patent [19]

Boutellier

[11] Patent Number: 4,537,464

[45] Date of Patent: Aug. 27, 1985

[54] INFRARED OBJECTIVE SYSTEM LENS

[75] Inventor: Roman Boutellier, Stüsslingen, Switzerland

[73] Assignee: Kern & Co. Ltd., Aarau, Switzerland

[21] Appl. No.: 506,595

[22] Filed: Jun. 22, 1983

[30] Foreign Application Priority Data

Jun. 25, 1982 [CH] Switzerland .................. 3912/82

[51] Int. Cl.³ ........................ G02B 9/14; G02B 13/14
[52] U.S. Cl. ........................... 350/1.4; 350/475
[58] Field of Search ............. 350/1.1, 1.2, 1.3, 1.4, 350/1.5, 474, 475, 477, 478

[56] References Cited

U.S. PATENT DOCUMENTS 3,160,700 12/1964 Snyder .................. 350/1.4
3,359,066 12/1967 Hutch et al. ............ 350/1.4

FOREIGN PATENT DOCUMENTS 2544148 4/1976 Fed. Rep. of Germany ....... 350/1.2

*Primary Examiner*—Bruce Y. Arnold
*Assistant Examiner*—Bruce S. Shapiro

[57] ABSTRACT

This invention provides an infrared lens system for the wavelength range of 3.5 μm–5 μm of F/1 and having an angle of field of 3.2°. The lens system consists of three lens elements. As viewed from the object side the first element is a positive lens (1) made of silicon (Si), the second element (3) is made of calcium fluoride ($CaF_2$) and the third is a positive lens (2) made of silicon (Si). This lens system is intended for use in a thermal imaging device, having a scanning mirror (4) and a radiation detector (5) with a sapphire cover (6). Thus a low cost achromatic infrared objective system is provided.

2 Claims, 6 Drawing Figures

INFRARED OBJECTIVE SYSTEM LENS

BACKGROUND OF THE INVENTION

1. Field of the Invention

This invention relates to an infrared objective system lens for the wavelength range of 3.5 μm–5 μm.

2. Description of the Prior Art

Known infrared objectives of the above kind (e.g. DE-A-3008343) have either large chromatic aberrations or if not, their cost is rather high because of the required material. An achromatic infrared objective of low price and tolerable correction of monochromatic aberrations is desirable in particular for use with detectors of low resolution.

SUMMARY OF THE INVENTION

The principal object of this invention is to provide a low cost achromatic infrared objective system of medium grade correction.

The present invention provides an infrared objective system lens for the wavelength range of 3.5 μm–5 μm, consisting, as viewed from the object side, of a first positive lens made of silicon, a second lens made of calcium fluoride and a third positive lens made of silicon.

The invention will be described more in detail with reference to illustrative embodiments shown in the accompanying drawings.

DESCRIPTION OF THE PREFERRED EMBODIMENTS

Figure 1:
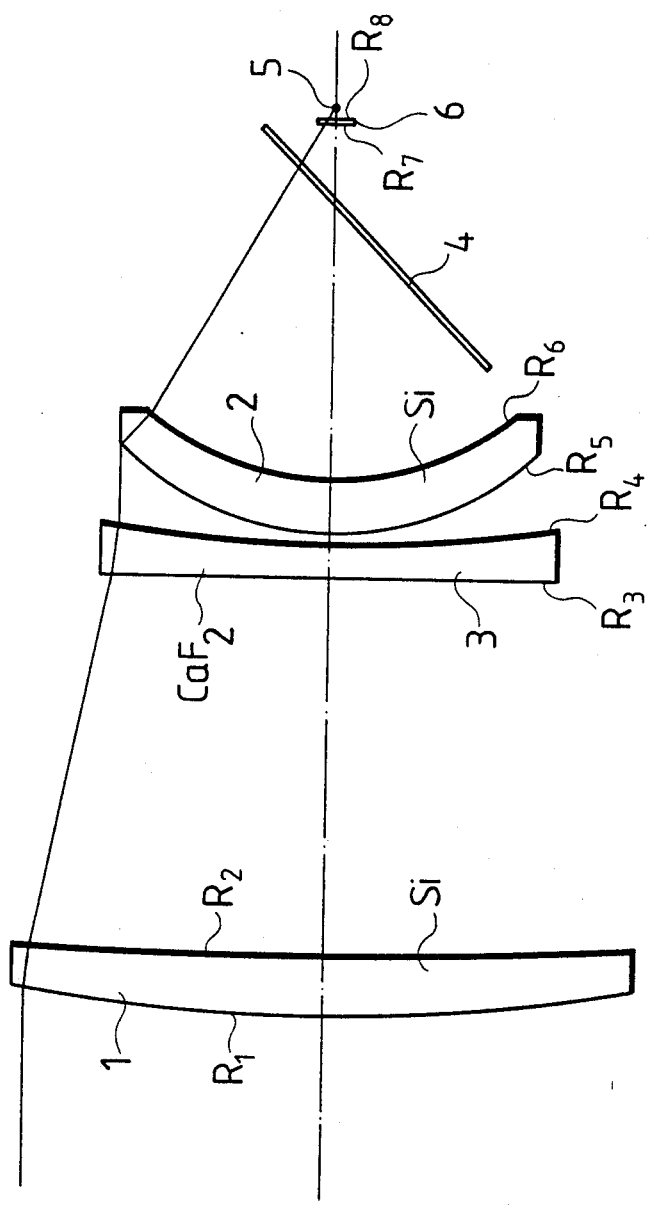
FIG. 1 illustrates a cross section of a first embodiment of the invention.
Figure 2:
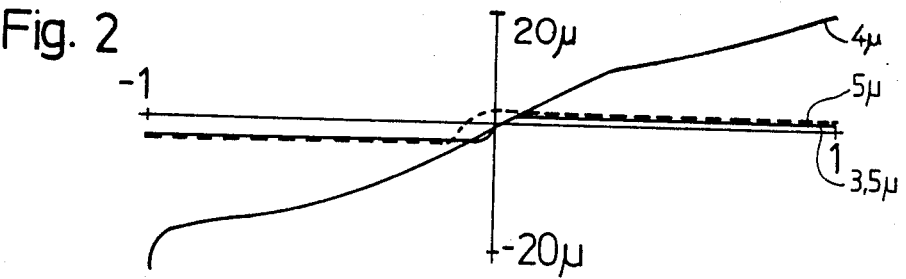
FIG. 2 shows the transverse aberrations of an objective system as shown in FIG. 1 and TABLE 1 in the center of the field in dependence upon relative aperture for infrared wavelengths 3.5 μm, 4 μm and 5 μm.
Figure 3:
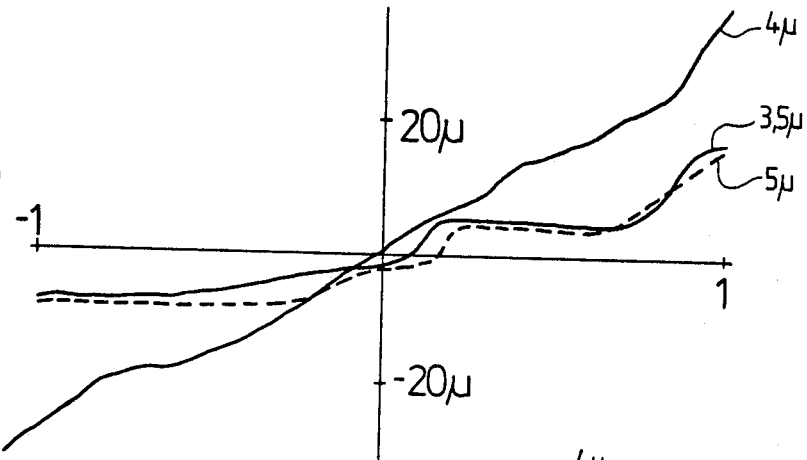
FIG. 3 shows the transverse aberrations of an objective system as shown in FIG. 1 and TABLE 1 for the meridional bundle of rays in the image zone in dependence upon relative aperture for infrared wavelengths 3.5 μm, 4 μm and 5 μm.
Figure 4:
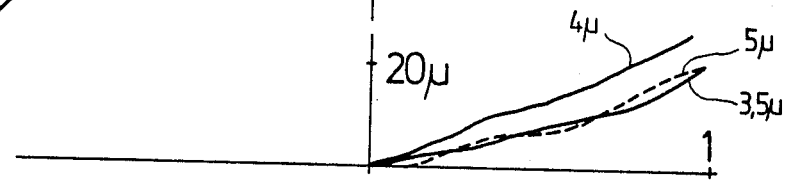
FIG. 4 shows the transverse aberrations of an objective system as shown in FIG. 1 and TABLE 1 for the sagittal bundle of rays in the image zone in dependence upon relative aperture for infrared wavelengths 3.5 μm, 4 μm and 5 μm.
Figure 5:
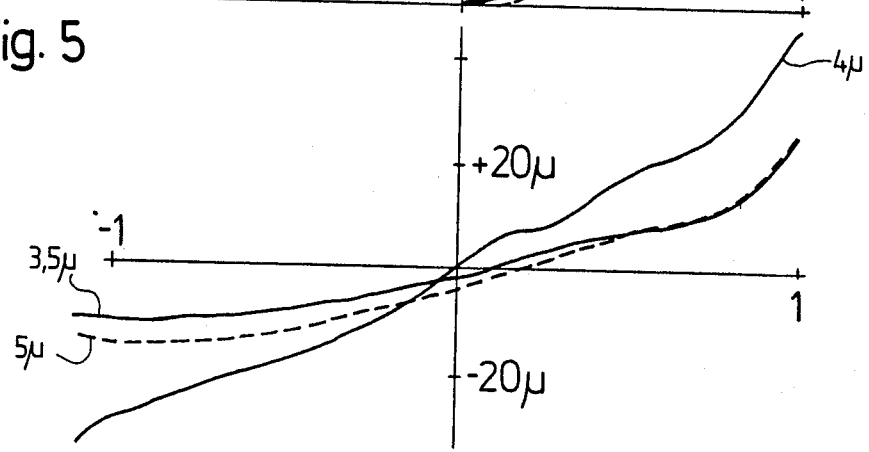
FIG. 5 shows the transverse aberrations of an objective system as shown in FIG. 1 and TABLE 1 for the meridional bundle of rays in the peripheral parts of the image in dependence upon relative aperture for infrared wavelengths 3.5 μm, 4 μm and 5 μm.
Figure 6:
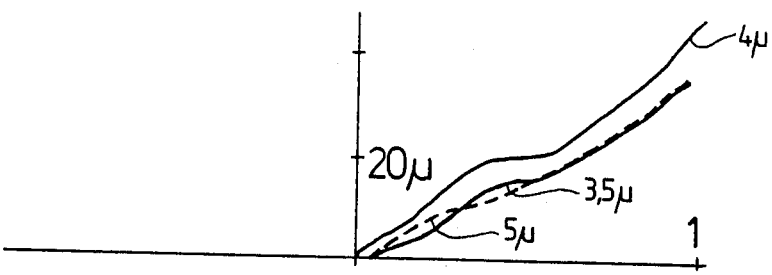
FIG. 6 represents the transverse aberrations of an objective system as shown in FIG. 1 and TABLE 1 for the sagittal bundle of rays in the peripheral parts of the image in dependence upon relative aperture for infrared wavelengths 3.5 μm, 4 μm and 5 μm.

In the cross section of the first embodiments shown in FIG. 1 the materials of the single lens elements are indicated. The front lens 1 and the meniscus lens 2 on the image side are made of silicon (Si). The third lens element 3 in between consists of calcium fluoride ($CaF_2$). This objective lens is intended for use in a thermal imaging device having a scanning mirror 4 and a radiation detector 5 with a sapphire cover 6 in front of it. This sapphire cover 6 has been considered in optimizing the data of the first embodiment given in the following TABLE 1, where t and s are the axial thicknesses of and separations between the respective lens elements, R are the radii of curvature of the successive surfaces, f is the focal length of the lens system, F is the aperture or speed, $s_s$ is the air separation between the lens 2 and the cover 6 and $S_D$ is the air separation between cover 6 and detector 5.

TABLE 1

| Lens Element Number | Radius of Curvature | Axial Thicknesses and Separations | Material |
|---|---|---|---|
| | \multicolumn{3}{c}{F = 1:1.0, f = 100.0} | |
| 1 | $R_1$ = 335.5 | t = 10.0 | Si |
| | $R_2$ = 819.8 | s = 59.6 | air |
| 3 | $R_3$ = 914.5 | t = 5.4 | $CaF_2$ |
| | $R_4$ = 260.0 | s = 1.6 | air |
| 2 | $R_5$ = 49.2 | t = 9.1 | Si |
| | $R_6$ = 51.8 | $s_s$ = 56.6 | air |
| 6 | $R_7$ = ∞ | t = 0.7 | sapphire |
| | $R_8$ = ∞ | $S_D$ = 2.5 | air |

Image size = 2.7, half field angle = 1.6°, radius of curvature of the image field = 17.

In the following TABLE 2 are given values of the modulation transfer function (MTF) in percent in dependence upon spatial frequency in cycles per mm for the lens system according to TABLE 1 with a radius of curvature of the image field R = 17, at aperture 0 (center of the image field), aperture 0.707 (image zone) and aperture 1.0 (periphery of the image field). For the calculation of the polychromatic MTF the different wavelengths are given the following weights: wavelength 3.5 μm weight 1, wavelength 4.0 μm weight 3, wavelength 4.5 μm weight 3 and wavelength 5 μm weight 3. MTF for image zone and for periphery of field are mean values for sagittal and meridional bundles.

TABLE 2

| cycles/mm | aperture | | |
|---|---|---|---|
| | 0 | 0.707 | 1.0 |
| 5 | 96% | 80% | 58% |
| 10 | 86% | 43% | 33% |
| \multicolumn{4}{c}{MTF values in percent} | | | |

In the following TABLE 3 are given the data of a second embodiment of an objective lens according to the present invention. R are the radii of curvature of the successive surfaces, t and s are the axial thicknesses of and separations between the respective lens elements, f is the focal length of the lens system, F is the aperture or speed and $s_D$ is the air separation between lens 2 and detector 5.

TABLE 3

| Lens Element Number | Radius of Curvature | Axial Thicknesses and Separations | Material |
|---|---|---|---|
| | \multicolumn{3}{c}{F = 1:1.0, f = 100.0} | |
| 1 | $R_1$ = 143.5 | t = 11.6 | Si |
| | $R_2$ = 180.4 | s = 30.8 | air |
| 3 | $R_3$ = 561.0 | t = 4.0 | $CaF_2$ |
| | $R_4$ = 685.0 | s = 28.7 | air |
| | $R_5$ = 65.9 | t = 8.5 | Si |

TABLE 3-continued

| Lens Element Number | F = 1:1.0, f = 100.0 Radius of Curvature | Axial Thicknesses and Separations | Material |
|---|---|---|---|
| 2 | $R_6 = 80.3$ | $S_D = 63.9$ | air |

Half field angle = 1.6°.

The state of correction of the embodiment of TABLE 3 is similar to that of TABLE 1, although the radius of curvature of the image field is smaller in the case of TABLE 1.

It is believed that the advantages and performance furnished by the infrared objective system lens of the invention will be apparent from the foregoing detailed description of the preferred embodiments of the invention. It will be apparent that various changes and modifications may be made without departing from the spirit and scope of the invention as defined in the accompanying claims.

I claim:

1. An infrared objective system lens with an image field that is convex toward the lens with a radius of curvature of 17.5, wherein the elements of the system have the following numerical values:

| Lens Element Number | f = 100.0 Radius of Curvature | Axial Thicknesses and Separations | Material |
|---|---|---|---|
| 1 | $R_1 = 335.5$ | $t = 10.0$ | Si |
|   | $R_2 = 819.8$ | $s = 59.6$ | air |
| 3 | $R_3 = 914.5$ | $t = 5.4$ | $CaF_2$ |
|   | $R_4 = 260.0$ | $s = 1.6$ | air |
| 2 | $R_5 = 49.2$ | $t = 9.1$ | Si |
|   | $R_6 = 51.8$ |  |  | where the indicated values of $R_1$, $R_2$, $R_5$ and $R_6$ may vary by ±5%, the indicated values of $R_3$ and $R_4$ may vary by ±20%, f is the focal length of the system and R is the radius of curvature of the indicated elements.

2. An infrared objective system lens with an image field that is convex toward the lens with a radius of curvature of 25, wherein the elements of the system have the following numerical values:

| Lens Element Number | f = 100.0 Radius of Curvature | Axial Thicknesses and Separations | Material |
|---|---|---|---|
| 1 | $R_1 = 143.5$ | $t = 11.6$ | Si |
|   | $R_2 = 180.4$ | $s = 30.8$ | air |
| 3 | $R_3 = 561.0$ | $t = 4.0$ | $CaF_2$ |
|   | $R_4 = 685.0$ | $s = 28.7$ | air |
| 2 | $R_5 = 65.9$ | $t = 8.5$ | Si |
|   | $R_6 = 80.3$ |  |  | where the indicated values of $R_1$, $R_2$, $R_5$ and $R_6$ may vary by ±5%, the indicated values of $R_3$ and $R_4$ may vary by ±20%, f is the focal length of the system and R is the radius of curvature of the indicated elements.

* * * * *